United States Patent
Iwaoka et al.

(10) Patent No.: US 11,456,121 B2
(45) Date of Patent: Sep. 27, 2022

(54) ELECTROLYTIC CAPACITOR AND METHOD FOR PRODUCTION THEREOF

(71) Applicant: Panasonic Intellectual Property Management Co., Ltd., Osaka (JP)

(72) Inventors: Kyohei Iwaoka, Osaka (JP); Makoto Nagashima, Kyoto (JP); Syusaku Koie, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/965,352

(22) PCT Filed: Feb. 21, 2019

(86) PCT No.: PCT/JP2019/006442
§ 371 (c)(1),
(2) Date: Jul. 28, 2020

(87) PCT Pub. No.: WO2019/167774
PCT Pub. Date: Sep. 6, 2019

(65) Prior Publication Data
US 2021/0125787 A1 Apr. 29, 2021

(30) Foreign Application Priority Data
Feb. 28, 2018 (JP) .............................. JP2018-035785

(51) Int. Cl.
*H01G 9/042* (2006.01)
*H01G 9/012* (2006.01)
*H01G 9/00* (2006.01)

(52) U.S. Cl.
CPC ......... *H01G 9/0425* (2013.01); *H01G 9/0029* (2013.01); *H01G 9/012* (2013.01)

(58) Field of Classification Search
CPC .............................. H01G 9/025; H01G 9/0425
See application file for complete search history.

(56) References Cited

U.S. PATENT DOCUMENTS

| | | | |
|---|---|---|---|
| 2002/0001168 A1 | 1/2002 | Ohata et al. | |
| 2005/0254198 A1* | 11/2005 | Matsumoto | H01G 9/0425 361/523 |
| 2014/0043728 A1 | 2/2014 | Kochi et al. | |

FOREIGN PATENT DOCUMENTS

| | | |
|---|---|---|
| JP | 10-242000 | 9/1998 |
| JP | 2001-274040 | 10/2001 |

(Continued)

OTHER PUBLICATIONS

International Search Report of PCT application No. PCT/JP2019/006442 dated May 7, 2019.

*Primary Examiner* — Eric W Thomas
(74) *Attorney, Agent, or Firm* — McDermott Will & Emery LLP

(57) ABSTRACT

An electrolytic capacitor includes a capacitor element. The capacitor element includes an anode body, a dielectric layer that covers at least a part of the anode body, a solid electrolyte layer that covers at least a part of the dielectric layer, and a cathode lead-out layer that covers at least a part of the solid electrolyte layer. The cathode lead-out layer includes a carbon layer and a silver-paste layer. The carbon layer is conductive and covers at least a part of the solid electrolyte layer. And the silver-paste layer covers at least a part of the carbon layer. The carbon layer contains carbon particles and silver.

12 Claims, 1 Drawing Sheet

(56) References Cited

FOREIGN PATENT DOCUMENTS

| | | | | |
|---|---|---|---|---|
| JP | 2006253169 | A | * | 9/2006 |
| JP | 2008010719 | A | * | 1/2008 |
| JP | 2009-176887 | | | 8/2009 |
| WO | 2012/017618 | | | 2/2012 |

* cited by examiner

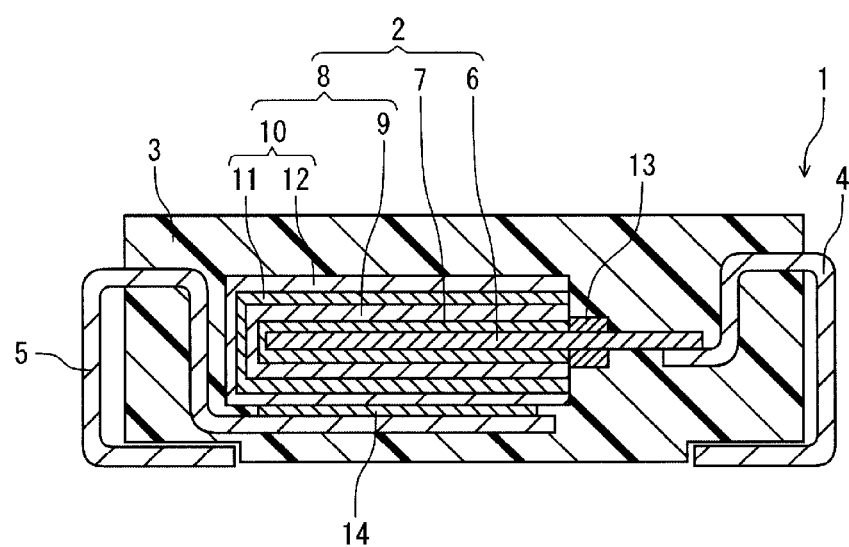

ELECTROLYTIC CAPACITOR AND METHOD FOR PRODUCTION THEREOF

CROSS-REFERENCE TO RELATED APPLICATIONS

This application is a U.S. national stage application of the PCT International Application No. PCT/JP2019/006442 filed on Feb. 21, 2019, which claims the benefit of foreign priority of Japanese patent application 2018-035785 filed on Feb. 28, 2018, the contents all of which are incorporated herein by reference.

TECHNICAL FIELD

The present disclosure relates to an electrolytic capacitor including a solid electrolyte layer and a method for manufacturing the same.

BACKGROUND

An electrolytic capacitor includes a capacitor element and an exterior body that covers the capacitor element. The capacitor element includes an anode body, a dielectric layer formed on the anode body, a solid electrolyte layer formed on the dielectric layer, and a cathode lead-out layer formed on the solid electrolyte layer. The cathode lead-out layer has a carbon layer formed on the solid electrolyte layer and a silver-paste layer formed on the carbon layer.

In the electrolytic capacitor, air may permeate the exterior body to enter inside of the electrolytic capacitor. When the air that has entered the inside of the electrolytic capacitor comes into contact with the solid electrolyte layer, a conductive polymer included in the solid electrolyte layer deteriorates.

In International Publication No. 2012/017618, it is proposed that by providing a silver-paste layer containing: first silver particles having a peak particle size less than or equal to 150 nm; second silver particles having a peak particle size of 500 nm or more; inorganic particles; and a resin material, deterioration of the solid electrolyte layer can be suppressed while contact resistance between the silver-paste layer and the carbon layer is being reduced.

SUMMARY

Technical Problem

In the conventional cathode lead-out layer, since the carbon layer is not dense, it is difficult to sufficiently suppress contact between the solid electrolyte layer and air. When the solid electrolyte layer comes into contact with air, the conductive polymer deteriorates and resistance of the solid electrolyte layer increases, so that equivalent series resistance (ESR) of the electrolytic capacitor increases.

Solution to Problem

One aspect of the present disclosure relates to an electrolytic capacitor that includes a capacitor element. The capacitor element includes an anode body, a dielectric layer that covers at least a part of the anode body, a solid electrolyte layer that covers at least a part of the dielectric layer, and a cathode lead-out layer that covers at least a part of the solid electrolyte layer. The cathode lead-out layer includes a carbon layer and a silver-paste layer. The carbon layer is conductive and covers at least a part of the solid electrolyte layer. And the silver-paste layer covers at least a part of the carbon layer. The carbon layer contains carbon particles and silver.

Another aspect of the present disclosure relates to a method for manufacturing an electrolytic capacitor. The method includes: forming a dielectric layer to cover at least a part of an anode body; forming a solid electrolyte layer to cover at least a part of the dielectric layer; forming a conductive carbon layer by attaching carbon paste to at least a part of the solid electrolyte layer; and forming a silver-paste layer on at least a part of the carbon layer. The carbon paste contains carbon particles, silver particles, and a dispersion medium.

Advantageous Effect of Invention

An increase in the ESR of an electrolytic capacitor including a solid electrolyte layer can be suppressed.

BRIEF DESCRIPTION OF DRAWING

FIG. 1 is a sectional view schematically illustrating an electrolytic capacitor according to one exemplary embodiment of the present disclosure.

DESCRIPTION OF EMBODIMENT

[Electrolytic Capacitor]

The electrolytic capacitor according to the above aspects of the present disclosure includes a capacitor element. The capacitor element includes an anode body, a dielectric layer that covers at least a part of the anode body, a solid electrolyte layer that covers at least a part of the dielectric layer, and a cathode lead-out layer that covers at least a part of the solid electrolyte layer. The cathode lead-out layer includes a carbon layer and a silver-paste layer. The carbon layer is conductive and covers at least a part of the solid electrolyte layer. And the silver-paste layer covers at least a part of the carbon layer. The carbon layer contains carbon particles and silver.

In an electrolytic capacitor, a capacitor element is usually covered with a resin exterior body, but air (particularly oxygen, or oxygen and moisture) easily permeates the exterior body to enter the inside. Meanwhile, in the capacitor element, at least a part of a solid electrolyte layer is covered with a carbon layer constituting a cathode lead-out layer. Since the carbon layer is in a state in which carbon particles are aggregated, it cannot be said that a film quality is dense. Hence, when air enters the electrolytic capacitor, it permeates the carbon layer. When air comes in contact with the solid electrolyte layer, it deteriorates a conductive polymer included in the solid electrolyte layer. Such deterioration of the conductive polymer becomes particularly remarkable under high temperature and/or high humidity. When the conductive polymer deteriorates, resistance of the solid electrolyte layer increases, and thus ESR of the electrolytic capacitor increases.

In the present exemplary embodiment, in the capacitor element, silver is contained in the carbon layer, which is included in the cathode lead-out layer that covers at least a part of the solid electrolyte layer, in addition to the carbon particles, as described above. When the carbon layer contains silver, a gas barrier property of the carbon layer is enhanced and air permeation is reduced. It is considered that this is because the carbon layer becomes dense due to filling gaps between the carbon particles with silver. By suppressing air permeation in the carbon layer, contact of air with the solid electrolyte layer is reduced. This suppresses the deterioration of the conductive polymer, and suppresses an increase in the resistance of the solid electrolyte layer. Hence, an increase in the ESR of the electrolytic capacitor can be suppressed.

Hereinafter, a configuration of the electrolytic capacitor will be described more specifically with appropriate reference to the view.

FIG. 1 is a sectional view schematically illustrating a structure of an electrolytic capacitor according to one exemplary embodiment of the present disclosure.

In the shown example, electrolytic capacitor 1 includes capacitor element 2, resin exterior body 3 sealing capacitor element 2, and anode lead terminal 4 and cathode lead terminal 5 at least parts of which are respectively exposed outside exterior body 3. Exterior body 3 has a substantially rectangular parallelepiped outer shape, and electrolytic capacitor 1 also has a substantially rectangular parallelepiped outer shape.

Capacitor element 2 includes anode body 6 that constitutes an anode part, dielectric layer 7 that covers anode body 6, and cathode part 8 that covers dielectric layer 7.

Anode body 6 includes a region facing cathode part 8 and a region not facing cathode part 8. In the region of anode body 6 that does not face cathode part 8, insulating separation layer 13 is formed in a part of the region which is adjacent to cathode portion 8 to cover a surface of anode body 6 in a strip shape. Hence, contact between cathode part 8 and anode body 6 is restricted. In the region of anode body 6 that does not face cathode part 8, a part other than the above part is electrically connected to anode lead terminal 4 by welding. Cathode lead terminal 5 is electrically connected to cathode part 8 via adhesive layer 14 made of a conductive adhesive.

Cathode part 8 includes solid electrolyte layer 9 that covers dielectric layer 7, and cathode lead-out layer 10 that covers solid electrolyte layer 9. Cathode lead-out layer 10 has carbon layer 11 and silver-paste layer 12. Here, carbon layer 11 contains carbon particles and silver. Since carbon layer 11 becomes dense by containing silver, contact of solid electrolyte layer 9 with air can be suppressed even if air enters the inside of exterior body 3. Hence, deterioration of the conductive polymer included in solid electrolyte layer 9 of cathode part 8 is suppressed.

Hereinafter, a configuration of the electrolytic capacitor will be described in more detail.

(Capacitor Element 2)

Capacitor element 2 includes anode body 6 that constitutes the anode part, dielectric layer 7, and cathode part 8 having solid electrolyte layer 9. Cathode part 8 includes solid electrolyte layer 9 and cathode lead-out layer 10 that covers solid electrolyte layer 9.

The electrolytic capacitor only needs to have at least one capacitor element 2, and may have one capacitor element 2 or a plurality of capacitor elements. A number of capacitor elements included in the electrolytic capacitor may be determined according to application.

(Anode Body 6)

Anode body 6 can include a valve metal, an alloy containing a valve metal, a compound containing a valve metal, or the like. These materials can be used alone or in combination of two or more. As the valve metal, for example, aluminum, tantalum, niobium, and titanium are preferably used. Anode body 6 having a porous surface can be obtained, for example, by roughening a surface of a base material (such as a foil-shaped or plate-shaped base material) containing a valve metal by etching or the like. Alternatively, anode body 6 may be a molded body of particles containing a valve metal or a sintered body thereof. Here, the sintered body has a porous structure. That is, when anode body 6 is a sintered body, entire anode body 6 can be porous.

(Dielectric Layer 7)

Dielectric layer 7 is formed by anodizing the valve metal of the surface of anode body 6 by an anodizing treatment or the like. Dielectric layer 7 only needs to be formed to cover at least a part of anode body 6. Dielectric layer 7 is usually formed on the surface of anode body 6. Since dielectric layer 7 is formed on the porous surface of anode body 6, it is formed along inner wall surfaces of holes and hollows (pits) in the surface of anode body 6.

Dielectric layer 7 contains an oxide of a valve metal. For example, when tantalum is used as the valve metal, the dielectric layer contains $Ta_2O_5$, and when aluminum is used as the valve metal, the dielectric layer contains $Al_2O_3$. Dielectric layer 7 is not limited to this and may be any one that functions as a dielectric material. When the surface of anode body 6 is porous, dielectric layer 7 is formed along the surface (including the inner wall surfaces of the holes) of anode body 6.

(Cathode Part 8)

(Solid Electrolyte Layer 9)

Solid electrolyte layer 9 constituting cathode part 8 contains a conductive polymer, but may further contain a dopant, an additive agent, etc., if necessary. As the conductive polymer, for example, polypyrrole, polythiophene, polyaniline, and their derivatives can be used. Solid electrolyte layer 9 can be formed, for example, by chemical polymerization and/or electropolymerization of a raw material monomer on dielectric layer 7. Alternatively, it can be formed by bringing a solution in which the conductive polymer is dissolved or a dispersion liquid in which the conductive polymer is dispersed into contact with dielectric layer 7. Solid electrolyte layer 9 only needs to be formed to cover at least a part of dielectric layer 7.

(Cathode Lead-Out Layer 10)

Cathode lead-out layer 10 that constitutes cathode part 8 includes carbon layer 11 and silver-paste layer 12. Cathode lead-out layer 10 is formed to cover at least a part of solid electrolyte layer 9.

(Carbon Layer 11)

Carbon layer 11 contains carbon particles and silver and has conductivity. Carbon layer 11 can contain a binder, and/or an additive agent, etc., if necessary.

As the carbon particles, conductive carbon particles are preferable. Examples of the carbon particles include graphite, graphene, carbon black, soft carbon, and hard carbon. As the graphite, a carbon material having a graphite-type crystal structure is used, and either artificial graphite or natural graphite may be used. As the carbon particles, carbon nanotubes, carbon fibers, etc., may be used. A fibrous carbon material, such as a carbon nanotube or a carbon fiber, may be cut into a suitable length (including a crushed material, etc.). These carbon particles may be used alone or in combination of two or more.

It is preferable that the carbon particles include flaky particles. In this case, it becomes easy to fill carbon layer 11 with the carbon particles in the state of overlapping with each other in a layered manner, and gaps between the flaky particles in an overlapping state can be filled with silver. Hence, dense carbon layer 11 can be formed, and an air entry path can be lengthened. Thus, an effect of suppressing air permeation in carbon layer 11 can be further enhanced. A type of the carbon material constituting the particles is not particularly limited as long as it has a flaky form, but graphite, graphene, and the like easily take a flaky form, and the flaky particles are easily available.

An average aspect ratio of the carbon particles is, for example, 1.5 or more, and preferably 2 or more. When the average aspect ratio of the carbon particles is within such a range, flat particles, such as flaky particles, are contained in a large quantity. Hence, it becomes easy to fill carbon layer 11 with the carbon particles in an overlapping state. In addition, an air entry path can be lengthened by filling gaps between the carbon particles with silver. Thus, the effect of suppressing air permeation in carbon layer 11 can be further enhanced.

The average aspect ratio of the carbon particles can be determined from an electron micrograph of a cross section of carbon layer 11 as follows. First, a plurality of (e.g., ten) carbon particles are arbitrarily selected, and maximum diameter D1 and maximum diameter D2 in a direction perpendicular to maximum diameter D1 are measured for each carbon particle. Then, an aspect ratio of each particle is determined by dividing D1 by D2, and the average aspect ratio is calculated by further averaging the measured aspect ratios.

An average particle size of the carbon particles is, for example, 0.05 μm or more, and preferably 0.1 μm or more. When the average particle size is within such a range, it is easy to densely fill carbon layer 11 with the carbon particles, and it is easy to ensure high conductivity. The average particle size of the carbon particles is preferably less than or equal to 10 μm, and more preferably less than or equal to 5 μm. In this case, the gaps between the carbon particles can be easily filled with silver, and thus the effect of suppressing air permeation in carbon layer 11 can be further enhanced.

The average particle size of the carbon particles can be determined by: arbitrarily selecting, in an electron micrograph of the cross section of carbon layer 11, a plurality of (e.g., ten) carbon particles; measuring a particle size of each carbon particle; and averaging the measured particle sizes. A diameter of a circle having the same area as an area of the cross section of the carbon particle observed in the electron micrograph is determined as the particle size of the carbon particle.

Carbon layer 11 contains carbon particles as the main component. A content proportion of the carbon particles in carbon layer 11 is, for example, more than 60 mass %, and preferably 70 mass % or more. When the content proportion of the carbon particles is within such a range, high adhesion can be ensured between solid electrolyte layer 9 and silver-paste layer 12. Also, the carbon particles can be easily arranged in carbon layer 11, and thus the effect of suppressing air permeation in carbon layer 11 can be further enhanced. An upper limit of the content proportion of the carbon particles in carbon layer 11 can be determined according to a content proportion of other components such as silver, and the upper limit is not particularly limited, but is, for example, less than or equal to 99 mass %.

The silver contained in carbon layer 11 may contain other metal elements. It is preferable that the content proportion of other metal elements in the silver is less than or equal to 0.1 mass %.

A shape of the silver contained in carbon layer 11 is not particularly limited. Carbon layer 11 is formed by using a carbon paste containing carbon particles and silver particles. Hence, in carbon layer 11, the silver may be contained as silver particles. When carbon layer 11 is formed by heating a coated film of the carbon paste, the silver particles may be aggregated or fused with each other. In such a case, carbon layer 11 contains silver in the forms of aggregated particles, bulk, etc. In carbon layer 11, silver of two or more shapes among non-aggregated particles, aggregated particles, bulk, etc., may exist in a mixed state.

It is preferable that an average particle size of the silver (including silver of various shapes such as non-aggregated particles, aggregated particles, bulk, etc.) contained in carbon layer 11 is, for example, 1 nm or more. When the average particle size of the silver is within such a range, the gaps between the carbon particles can be easily filled with the silver, and thus the effect of suppressing air permeation in carbon layer 11 can be further enhanced. From a viewpoint of easily ensuring high adhesion between solid electrolyte layer 9 and silver-paste layer 12, it is preferable that the average particle size of the silver contained in carbon layer 11 is less than or equal to 1000 nm.

The average particle size of the silver contained in carbon layer 11 can be determined by: arbitrarily selecting, in an electron micrograph of the cross section of carbon layer 11, a plurality of (e.g., ten) silver portions (particles, aggregated particles, bulk, etc.); measuring a particle size of each silver portion; and averaging the measured particle sizes. A diameter of a circle having the same area as an area of the cross section of the silver portion observed in the electron micrograph is determined as the particle size of the silver portion.

A content proportion of the silver in carbon layer 11 is preferably 0.1 mass % or more, more preferably 1 mass % or more, and may be 5 mass % or more. When the content proportion of the silver is within such a range, the gaps between the carbon particles can be easily filled with the silver, and thus the effect of suppressing air permeation in carbon layer 11 can be further enhanced. From the viewpoints of easily arranging carbon particles and easily ensuring high adhesion between solid electrolyte layer 9 and silver-paste layer 12, the content proportion of the silver in carbon layer 11 is less than or equal to 40 mass %, and more preferably less than or equal to 30 mass %.

The content proportion of the silver in carbon layer 11 can be determined by using, for example, energy dispersive X-ray spectroscopy (SEM-EDX).

As the binder and the additive agent contained in carbon layer 11, publicly known components, each of which is to be used in a carbon layer of an electrolytic capacitor, can be used without particular limitation.

An average thickness of carbon layer 11 is, for example, between 0.01 μm and 50 μm (inclusive). The average thickness can be determined, for example, by: measuring, in an electron micrograph of the cross section of carbon layer 11, thicknesses of a plurality of (e.g., ten) locations of carbon layer 11; and averaging the measured thicknesses.

(Silver-Paste Layer 12)

Silver-paste layer 12 contains, for example, silver particles and a binder. Silver-paste layer 12 can contain an additive agent, etc., if necessary. Examples of the additive agent include publicly known additives to be used in a silver-paste layer.

The silver particles may contain other metal elements. A content proportion of other metal elements in the silver particles is preferably less than or equal to 0.1 mass %.

The content proportion of silver in silver-paste layer 12 is, for example, more than 50 mass %, and preferably 70 mass % or more. When the content of the silver is within such a range, high conductivity of silver-paste layer 12 is ensured, and thus a current collecting property from capacitor element 2 can be enhanced.

The binder contained in silver-paste layer 12 is not particularly limited, but a cured product of a curable resin is preferable. Examples of the curable resin include thermosetting resins such as an epoxy resin.

(Exterior Body 3)

Exterior body 3 covers capacitor element 2. Usually, parts of lead terminals 4, 5 are also covered with exterior body 3. Exterior body 3 is formed by sealing capacitor element 2 and parts of lead terminals 4, 5 with a resin material.

Exterior body 3 preferably contains a cured product of a curable resin composition, and may contain a thermoplastic resin or a composition containing the same. As the curable resin composition and the thermoplastic resin (composition), what are illustrated below can be used.

In exterior body 3 formed of a resin material, the resin material is easily deteriorated or damaged by a mechanical shock, and external air easily permeates exterior body 3 to enter the exterior body. According to the present exemplary embodiment, carbon layer 11 becomes dense due to containing the silver, and hence the gas barrier property of carbon layer 11 is enhanced, and even when exterior body 3 formed of a resin material is used, the contact of solid electrolyte layer 9 with air can be suppressed (or reduced).

(Lead Terminals 4, 5)

One ends of lead terminals 4, 5 are electrically connected to capacitor element 2, and the other ends thereof are drawn out of exterior body 3. In electrolytic capacitor 1, one end sides of lead terminals 4, 5 are covered with exterior body 3 along with capacitor element 2. As lead terminals 4, 5, a lead terminal to be used in electrolytic capacitors can be used without particular limitation, and for example, what is called a lead frame may be used. Examples of materials of lead terminals 4, 5 include metals such as copper and alloys thereof.

[Method for Manufacturing Electrolytic Capacitor]

The above electrolytic capacitor is manufactured by a manufacturing method including: forming a dielectric layer so as to cover at least a part of the anode body; forming a solid electrolyte layer so as to cover at least a part of the dielectric layer; and forming a cathode lead-out layer on at least a part of the solid electrolyte layer. The forming a cathode lead-out layer has: forming a carbon layer; and forming a silver-paste layer on at least a part of the carbon layer. The method for manufacturing the electrolytic capacitor may further include, before the forming a dielectric layer, providing an anode body. In addition, the method for manufacturing the electrolytic capacitor may further include: electrically connecting lead terminals to a capacitor element; and covering the capacitor element and parts of the lead terminals with an exterior body (sealing step).

Hereinafter, each step will be described in more detail.

(Step of Preparing Anode Body 6)

In this step, anode body 6 that constitutes the anode part is formed by a publicly known method according to a type of anode body 6.

Anode body 6 can be provided, for example, by roughening a surface of a foil-shaped or plate-shaped base material containing a valve metal. The roughening only needs to form irregularities on the surface of the base material, and may be performed, for example, by etching (e.g., electrolytically etching) the surface of the base material.

Alternatively, not limited to the above case, powder of the valve metal is molded into a desired shape (e.g., a block shape) to obtain a molded body. Anode body 6 having a porous structure may be formed by sintering this molded body.

(Step of Forming Dielectric Layer 7)

In this step, dielectric layer 7 is formed on anode body 6. Dielectric layer 7 is formed by anodizing anode body 6. The anodization can be performed by a publicly known method such as an anodizing treatment. The anodizing treatment can be performed, for example, by: immersing anode body 6 in an anodizing liquid to impregnate the surface of anode body 6 with the anodizing liquid; and applying a voltage between an anode obtained by using anode body 6 and a cathode immersed in the anodizing liquid. It is preferable that as the anodizing liquid, for example, a phosphoric acid aqueous solution is used.

(Step of Forming Solid Electrolyte Layer 9)

In this step, solid electrolyte layer 9 is formed on dielectric layer 7. For example, a treatment liquid containing a conductive polymer is attached to anode body 6 on which dielectric layer 7 is formed, and then dried to form solid electrolyte layer 9. The treatment liquid may further contain other components such as a dopant. As the conductive polymer, for example, poly(3,4-ethylenedioxythiophene) (PEDOT) is used. As the dopant, for example, polystyrenesulfonic acid (PSS) is used. The treatment liquid is, for example, a dispersion liquid or a solution of the conductive polymer. Examples of a dispersion medium (solvent) include water, organic solvents, or mixtures thereof. Solid electrolyte layer 9 may be formed by chemical polymerization and/or electropolymerization of a raw material monomer of the conductive polymer on dielectric layer 7.

(Step of Forming Cathode Lead-Out Layer 10)

In this step, cathode lead-out layer 10 is formed on solid electrolyte layer 9 by sequentially laminating carbon layer 11 and silver-paste layer 12.

(Step of Forming Carbon Layer 11)

In this step, carbon layer 11 is formed by attaching carbon paste to at least a part of solid electrolyte layer 9. Carbon layer 11 may be formed by further heating the coated film of the carbon paste formed on at least a part of solid electrolyte layer 9.

The carbon paste contains carbon particles, silver particles, and a dispersion medium. As the dispersion medium, water, an organic medium, or a mixture thereof is used. The carbon paste can contain a binder and/or an additive agent, etc., if necessary.

Examples of the carbon particles contained in the carbon paste include those described for carbon layer 11. It is preferable that the carbon particles include flaky particles. An average aspect ratio and an average particle size of the carbon particles can be selected from the ranges described for carbon layer 11, respectively.

The average aspect ratio and the average particle size of the carbon particles are ones measured for the carbon particles to be used in the carbon paste, respectively. The average aspect ratio of the carbon particles can be calculated in the same way as in the case of the average aspect ratio of the carbon particles contained in carbon layer 11, except that the average aspect ratio is determined from an electron micrograph of the carbon particles. The average particle size of the carbon particles is the 50% particle size D50 (i.e., median size) in a volume-based particle size distribution obtained by using a laser diffraction/scattering particle size distribution analyzer.

A proportion of the carbon particles in a solid component of the carbon paste is, for example, preferably 60 mass % or more, and more preferably 70 mass % or more. When a proportion of the carbon particles is within such a range, high adhesion can be ensured between solid electrolyte layer 9 and silver-paste layer 12. Also, the carbon particles are easily arranged in carbon layer 11, and thus the effect of suppressing air permeation in carbon layer 11 can be further enhanced. An upper limit of the proportion of the carbon particles in the carbon paste can be determined according to a proportion of other components, such as silver particles, and is not particularly limited, but is, for example, less than or equal to 99 mass %.

The silver particles may contain other metal elements. It is preferable that a content proportion of the other metal elements in the silver is less than or equal to 0.1 mass %.

An average particle size of the silver particles is, for example, less than or equal to 1000 nm. In particular, when silver particles having an average particle size of less than 1000 nm are used, even if the temperature at which the coated film of the carbon paste is to be heated is lowered, the silver particles can be sintered and fused due to a nano-size effect of the silver particles. Hence, carbon layer 11 having high conductivity can be formed. Also, the gaps between the carbon particles can be easily filled with the silver, and thus the permeation of air in carbon layer 11 can be further suppressed. Here, the silver particles having an average particle size of less than 1000 nm may be referred to as silver nanoparticles. It is more preferable that the average particle size of the silver particles is less than or equal to 100 nm. When the average particle size of the silver particles is within such a range, sinterability of the silver particles at a low temperature can be enhanced. The average particle size of the silver particles is, for example, 20 nm or more, and may be 30 nm or more.

The average particle size of the silver particles is the 50% particle size D50 (i.e., median size) in a volume-based particle size distribution obtained by using a laser diffraction/scattering particle size distribution analyzer. When the volume-based D50 is difficult to measure, however, it may be an average particle size measured by using a dynamic light scattering particle size distribution analyzer.

A proportion of the silver particles in a solid component of the carbon paste is preferably 0.1 mass % or more, more preferably 1 mass % or more, and may be 5 mass % or more. When a proportion of the silver particles is within such a range, the gaps between the carbon particles in carbon layer 11 can be easily filled with the silver. From the viewpoints of easily arranging the carbon particles in carbon layer 11 and easily ensuring high adhesion between solid electrolyte layer 9 and silver-paste layer 12, the proportion of the silver particles in the solid component of the carbon paste is preferably less than or equal to 40 mass %, and more preferably less than or equal to 30 mass %.

The binder to be contained in the carbon paste is not particularly limited, and examples thereof include publicly known binders to be used for producing a carbon layer. As the binder, for example, a polymer binder, such as a thermoplastic resin (polyester resin or the like) or a thermosetting resin (polyimide resin, epoxy resin or the like), is preferable.

The additive agent is not particularly limited, and examples thereof include publicly known additive agents to be used for producing a carbon layer. Examples of the additive agent include, for example, dispersants, surfactants, antioxidants, preservatives, bases, and/or acids.

Carbon layer 11 may be formed by attaching a carbon paste to at least a part of solid electrolyte layer 9 to form a coated film and then by drying it. After being formed, the coated film may be further heated. The heating may sinter and fuse the silver particles to each other, and form aggregated particles and/or bulk silver.

It is only necessary to bring the carbon paste into contact with solid electrolyte layer 9, and, for example, anode body 6 including solid electrolyte layer 9 may be immersed in the carbon paste, or the carbon paste may be coated on the surface of electrolyte layer 9 by using a publicly known coater or the like.

The temperature at which the coated film of the carbon paste is heated ranges, for example, from 150° C. to 300° C., inclusive.

(Step of Forming Silver-Paste Layer 12)

In this step, silver-paste layer 12 is formed on at least a part of carbon layer 11. Silver-paste layer 12 can be formed by attaching silver-paste to at least a part of carbon layer 11. The silver-paste can contain silver particles, a binder, a dispersion medium, and, if necessary, an additive agent. For the silver particles, the binder, and the additive agent, the description of silver-paste layer 12 can be referred to. Examples of the dispersion medium include water, organic media, and mixtures thereof.

Proportions of the silver particles and the binder in a solid component of the silver-paste may be properly set to be the ranges described for the content proportion of the silver in silver-paste layer 12, respectively.

Silver-paste layer 12 can be formed by drying and/or heating a coated film of the silver-paste formed on at least a part of carbon layer 11. For example, when a thermosetting resin is used as the binder, silver-paste layer 12 is formed by heating the coated film of the silver-paste to cure the binder.

(Step of Connecting Lead Terminal)

In this step, anode lead terminal 4 and cathode lead terminal 5 are electrically connected to capacitor element 2. The connecting of each lead terminal may be performed after capacitor element 2 is produced. The connecting of cathode lead terminal 4 to capacitor element 2 is performed after capacitor element 2 is produced, but the connecting of anode lead terminal 5 to anode body 6 may be performed at an appropriate stage of the process of producing capacitor element 2. For example, when the anode body having a porous structure is formed by sintering, a molded body molded into a desired shape is obtained while one end in the longitudinal direction of a rod-shaped anode lead terminal is embedded in the powder of the valve metal. Then, the anode body having a porous structure, in which one end of the anode lead terminal is embedded, may be formed by sintering the molded body.

When a laminated body of a plurality of capacitor elements is used, anode lead terminal 4 can be connected to anode body 6 in the same way as described above. Cathode lead terminal 5 may be connected to the capacitor element in the same way as described above, or one end of cathode lead terminal 5 may be connected to the laminated body of a plurality of the capacitor elements in which cathode parts 8 are electrically connected together.

(Step of Sealing)

In this step, capacitor element 2 is sealed with exterior body 3 by covering capacitor element 2 and parts of lead terminals 4, 5 with exterior body 3. More specifically, after capacitor element 2 and lead terminals 4, 5 are electrically connected, capacitor element 2 and parts of lead terminals 4, 5 are covered with a resin that constitutes the resin exterior body, whereby the sealing can be performed.

Exterior body 3 can be formed by using a molding technique such as injection molding, insert molding, or compression molding. Exterior body 3 can be formed, for example, by using a predetermined mold and filling predetermined locations thereof with a curable resin composition or a thermoplastic resin (composition) so as to cover capacitor element 2 and one ends of lead terminals 4, 5. When the laminated body of a plurality of the capacitor elements is used, the resin exterior body may be formed to cover the laminated body and parts of the lead terminals.

The curable resin composition may contain a filler, a curing agent, a polymerization initiator, and/or a catalyst, etc., in addition to the curable resin. Examples of the curable resin include epoxy resin, phenol resin, urea resin, polyimide, polyamideimide, polyurethane, diallyl phthalate, unsaturated polyester, etc. The curable resin composition may include a plurality of curable resins.

As the filler, for example, insulating particles (inorganic, organic) and/or fibers are preferable. Examples of an insulating material that constitutes the filler include: insulating compounds (oxides, etc.) such as silica and alumina; glass; and mineral materials (talc, mica, clay, etc.). The resin exterior body may contain one type of these fillers, or may contain two or more types in combination. A content proportion of the filler in the resin exterior body is, for example, 10 mass % to 90 mass %.

As the thermoplastic resin, for example, polyphenylene sulfide (PPS), or polybutylene terephthalate (PBT) can be used. A composition containing the thermoplastic resin may contain the above-mentioned filler, etc., in addition to the thermoplastic resin.

Here, the steps other than the forming carbon layer 11 are not limited to the above, and publicly known methods can be adopted.

EXAMPLES

Hereinafter, the present disclosure will be specifically described based on examples and comparative examples, but the present disclosure is not limited to the following examples.

Examples 1 to 3 and Reference Examples 1 to 2

Electrolytic capacitor 1 shown in FIG. 1 was produced according to the following procedure, and its characteristics were evaluated.
(1) Production of Capacitor Element An aluminum foil (thickness: 100 µm) was provided as a base material, and a surface of the aluminum foil was subjected to an etching treatment to obtain anode body 6. Dielectric layer 7 containing aluminum oxide ($Al_2O_3$) was formed on the surface of anode body 6 by immersing anode body 6 in a phosphoric acid solution having a concentration of 0.3 mass % (liquid temperature: 70° C.) and applying a DC voltage of 70 V for 20 minutes. Thereafter, an insulating resist tape (separation layer 13) was attached to a predetermined portion of anode body 6.

Anode body 6 on which dielectric layer 7 was formed was immersed in an aqueous dispersion liquid (concentration: 2 mass %) of poly(3,4-ethylenedioxythiophene) (PEDOT) doped with polystyrene sulfonic acid (PSS). After that, it was dried to form solid electrolyte layer 9.

After a dispersion liquid (carbon paste), in which flaky graphite particles and silver nanoparticles (average particle size: 40 nm) were dispersed in water, was coated on solid electrolyte layer 9, the coated layer was heated at 200° C., whereby carbon layer 11 was formed on the surface of solid electrolyte layer. A content proportion of the silver nanoparticles in a solid component of the carbon paste was adjusted such that the content proportion of the silver in carbon layer 11 measured by the above-described procedure became the values shown in Table 1. Proportions of the graphite particles in the solid components of the carbon pastes were 92 mass % (Example 1), 82 mass % (Example 2), 70 mass % (Example 3), 37 mass % (Reference example 1), and 23 mass % (Reference Example 2), respectively. Proportions of the graphite particles in carbon layer 11 determined by the above-described procedure were substantially the same as the proportions of graphite particles in the solid components of the carbon pastes.

Next, after silver-paste containing silver particles and a binder resin (epoxy resin) was coated on the surface of carbon layer 11, the binder resin was cured by heating to form silver-paste layer 12. Thus, cathode lead-out layer 10 made of carbon layer 11 and silver-paste layer 12 was formed.

Capacitor element 2 was obtained as described above.
(2) Assembly of Electrolytic Capacitor Anode lead terminal 4, cathode lead terminal 5, and adhesive layer 14 were further arranged in capacitor element 2, and exterior body 3 was formed by using a resin containing silica particles as a filler, whereby an electrolytic capacitor was produced.

Comparative Example 1

An electrolytic capacitor was produced in the same way as in Example 1 except that carbon paste was prepared without using silver nanoparticles.

The following evaluations were performed on the electrolytic capacitors of Examples, Reference examples, and Comparative example produced above.
[Evaluation]

An ESR value (mΩ) at a frequency of 100 kHz of the electrolytic capacitor was measured as an initial ESR value ($X_0$) (mΩ) by using an LCR meter for 4-terminal measurement under an environment of 20° C. The electrolytic capacitor was then heated at 270° C. for 3 minutes, and then heating was continued at 145° C. An ESR value ($X_1$) (mΩ) of the electrolytic capacitor, occurring 500 hours after the start of the heating at 270° C., was measured by the same method as described above. Then, an ESR change rate was determined from the following equation.

ESR change rate=$X_1/X_0$

Table 1 shows the evaluation results. A1 to A3 represent Examples 1 to 3, B1 represents Comparative example 1, and C1 and C2 represent Reference examples 1 and 2.

TABLE 1

| | Proportion of silver in carbon layer (mass %) | ESR change rate |
|---|---|---|
| B1 | 0 | 8.3 |
| A1 | 8 | 3.5 |
| A2 | 18 | 4.7 |
| A3 | 30 | 5.1 |
| C1 | 63 | 15.5 |
| C2 | 77 | 129 |

INDUSTRIAL APPLICABILITY

The electrolytic capacitor according to the above aspects of the present disclosure can suppress deterioration of the conductive polymer contained in the solid electrolyte layer even when the electrolytic capacitor is exposed to a high temperature atmosphere or a high humidity atmosphere, and can suppress an increase in ESR. Therefore, the electrolytic capacitor can be used in various applications in which low ESR is required.

The invention claimed is:

1. An electrolytic capacitor comprising a capacitor element, the capacitor element including:
   an anode body;
   a dielectric layer that covers at least a part of the anode body;
   a solid electrolyte layer that covers at least a part of the dielectric layer; and
   a cathode lead-out layer that covers at least a part of the solid electrolyte layer, wherein:
   the cathode lead-out layer includes a carbon layer and a silver-paste layer, the carbon layer being conductive and covering at least a part of the solid electrolyte layer, the silver-paste layer covering at least a part of the carbon layer,
   the carbon layer contains carbon particles and silver, and is in direct contact with the solid electrolyte layer,
   the carbon particles include flaky particles,
   a gap between the flaky particles in an overlapping state is filled with the silver, and
   a content proportion of the silver in the carbon layer ranges from 8 mass % to 30 mass %, inclusive.

2. The electrolytic capacitor according to claim 1, wherein a content proportion of the carbon particles in the carbon layer is 70 mass % or more.

3. The electrolytic capacitor according to claim 1, wherein the carbon particles have an average aspect ratio of 1.5 or more.

4. The electrolytic capacitor according to claim 1, wherein the carbon particles have an average particle size ranging from 0.1 µm to 5 µm, inclusive.

5. The electrolytic capacitor according to claim 1, wherein the silver has an average particle size ranging from 1 nm to 1000 nm, inclusive.

6. A method for manufacturing an electrolytic capacitor, the method comprising:
   forming a dielectric layer to cover at least a part of an anode body;
   forming a solid electrolyte layer to cover at least a part of the dielectric layer;
   forming a carbon layer by applying carbon paste directly on at least a part of the solid electrolyte layer, the carbon layer being conductive; and
   forming a silver-paste layer on at least a part of the carbon layer, wherein:
   the carbon paste contains carbon particles, silver particles, and a dispersion medium,
   the carbon particles include flaky particles,
   a gap between the flaky particles in an overlapping state is filled with silver of the silver particles after the forming of the conductive carbon layer, and
   a proportion of the silver particles in the solid component of the carbon paste ranges from 8 mass % to 30 mass %, inclusive.

7. The method for manufacturing an electrolytic capacitor according to claim 6, wherein a proportion of the carbon particles in a solid component of the carbon paste is 70 mass % or more.

8. The method for manufacturing an electrolytic capacitor according to claim 6, wherein the silver particles have an average particle size of less than 1000 nm.

9. The method for manufacturing an electrolytic capacitor according to claim 6, wherein the carbon particles have an average aspect ratio of 1.5 or more.

10. The method for manufacturing an electrolytic capacitor according to claim 6, wherein the carbon particles have an average particle size ranging from 0.1 µm to 5 µm, inclusive.

11. The method for manufacturing an electrolytic capacitor according to claim 6, wherein the carbon paste is formed by dispersing the carbon particles and the silver particles in the dispersion medium.

12. The electrolytic capacitor according to claim 1, wherein a shape of the silver includes at least one of the group consisting of non-aggregated particles, aggregated particles, and bulk.

* * * * *